Aug. 9, 1927.

A. S. BUTELL

SHIFT LEVER

Original Filed Dec. 31, 1925   2 Sheets-Sheet 1

1,638,182

A. S. Butell  Inventor

By Lacey & Lacey  Attorneys

Aug. 9, 1927.
A. S. BUTELL
1,638,182
SHIFT LEVER
Original Filed Dec. 31, 1925   2 Sheets-Sheet 2
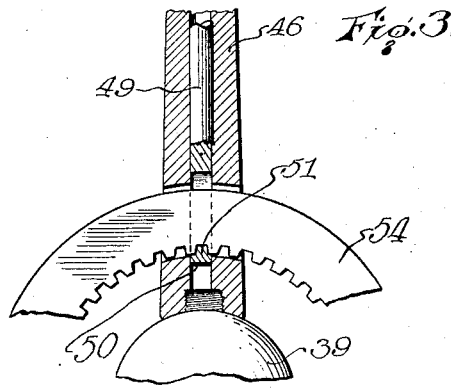
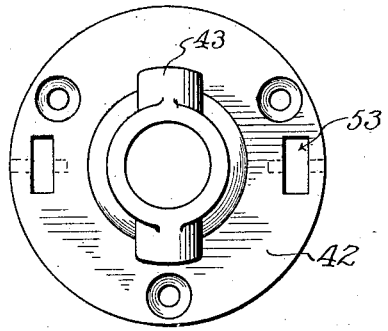
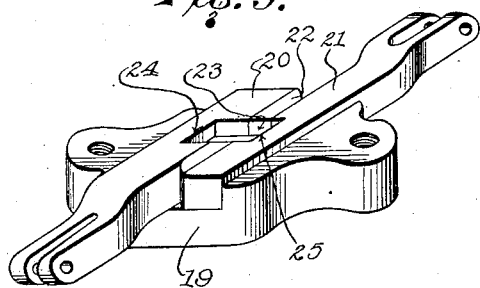
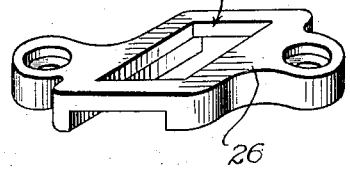
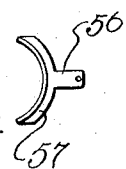
A. S. Butell, Inventor
By Lacey & Lacey, Attorneys Patented Aug. 9, 1927.

1,638,182

UNITED STATES PATENT OFFICE.

ADOLPHUS SHADE BUTELL, OF DURANGO, COLORADO.

SHIFT LEVER.

Original application filed December 31, 1925, Serial No. 78,661. Divided and this application filed June 29, 1926. Serial No. 119,494.

This invention relates to an improved shift lever for motor vehicle transmissions, being a division of my copending application for transmission filed December 31, 1925, Serial No. 78,661.

The invention seeks, among other objects, to provide a shift lever which will not only be peculiarly applicable for use in connection with my improved transmission but will also be well adapted for general use and wherein means will be provided for locking the lever when set to shift a selected gear and accordingly locking said gear in active position.

Other objects of the invention not specifically mentioned in the foregoing will appear during the course of the following description.

In the accompanying drawings:

Figure 3 is an enlarged fragmentary sectional view through the lever at a right angle to Figure 1.

Figure 4 is a plan view of the ball retaining cap.

Figure 5 is a detail perspective view particularly showing the shifter bars and supporting block.

Figure 6 is a detail perspecive view of the retaining plate for the shifter bars.

Figure 7 is a plan view of one of the tensioning springs of the lever.

Figures 1, 2:
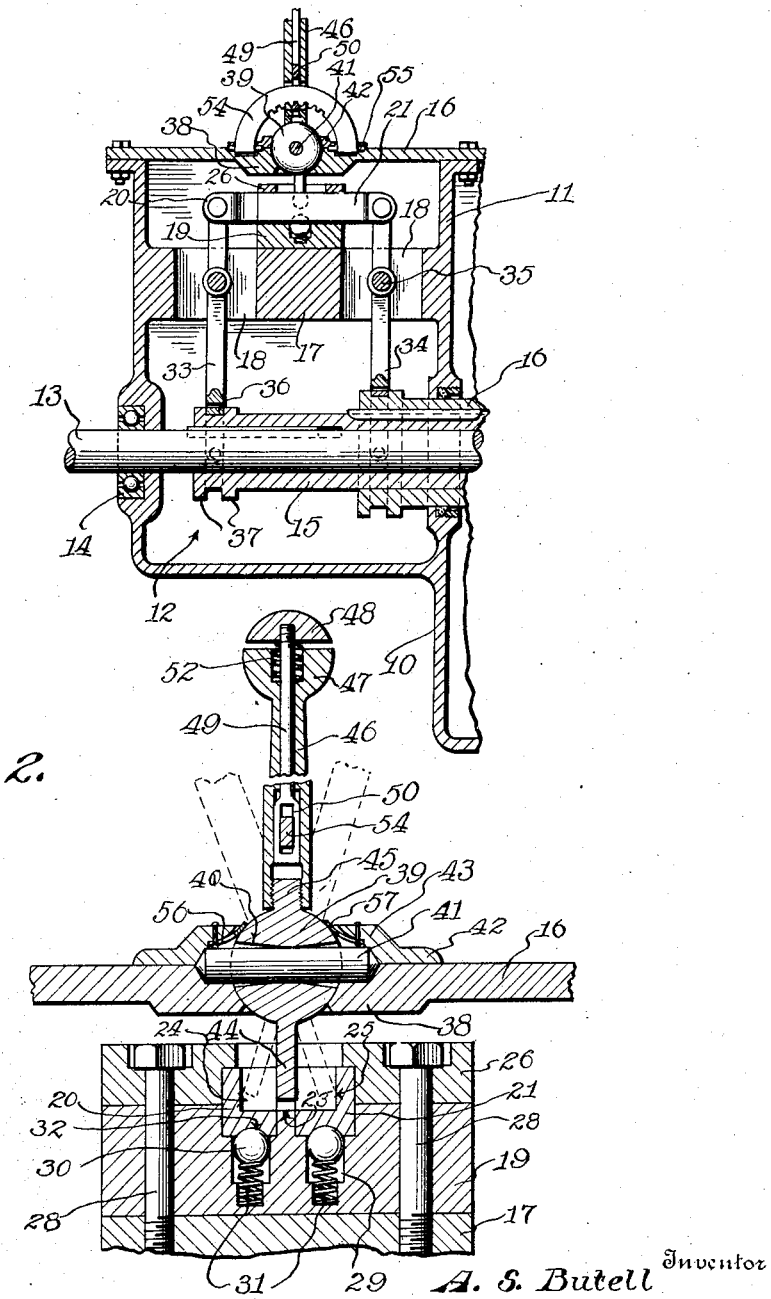
Figure 1 is a fragmentary vertical sectional view showing the present invention in connection with the transmission case and associated parts of the transmission disclosed in my prior application previously identified.
Figure 2 is a vertical sectional view particularly showing the mounting of the ball of the lever.

Referring now more particularly to the drawings, I have shown a transmission casing at 10. This casing is provided with a partition 11 defining a chamber 12 at the front of the casing, and journaled through said chamber is a drive shaft 13 rotatably supported by suitable bearings, one of which is shown at 14. Splined on the shaft 13 is a sleeve 15, and splined on said sleeve is a second surrounding sleeve 16. In accordance with the invention shown in the parent case, these sleeves carry suitable spiders which, in turn, mount peculiar clutch members, and the sleves are shiftable endwise for shifting the spiders and moving the clutch members to active and inactive position. Closing the chamber 12 of the casing is a cover plate 16.

Extending horizontally within the chamber 12 is a cross bar 17 in which are formed spaced slots 18. The cross bar is integral with the front wall of the casing and with the partition 11, and resting upon said bar between the slots 18 is a guide block 19. As seen in Figures 2 and 5 of the drawings, the block is slotted at its upper side to slidably receive a pair of oppositely directed shifter bars 20 and 21, and projecting between said bars is a separator 22 integral with the block. The separator is provided with a notch 23 while the bars 20 and 21 are provided with notches 24 and 25 which normally register with the notch 23. Fitting over the bars is a cap plate 26 mating with the block 19. As seen in Figures 2 and 6, the cap plate is recessed to slidably accommodate the bars, and formed in said plate is a medial oblong opening 27. The block and plate are provided with registering ears and extending through said ears are cap bolts 28 which are screwed into the cross bar 17 for rigidly connecting said block and plate with the bar. Thus, the shifter bars 20 and 21 are slidably confined between the plate 26 and the block 19, and formed in said block, beneath the bars, as shown in Figure 2, are recesses 29 freely accommodating ball detents 30. Disposed beneath said detents are springs 31 pressing the detents upwardly, and formed in the shifter bars are sockets 32 to accommodate said detents so that the detents will thus function to normally lock the shifter bars in neutral position. Freely accommodated by the slots 18 of the cross bar 17 are shifter forks 33 and 34 pivoted upon pins 35 which extend through the cross bar at the slots. At their upper ends, these forks are pivotally connected with the ends of the shifter bars 20 and 21, and pivotally engaged with the lower ends of the forks are substantially semicircular yokes 36 freely confined between pairs of annular flanges 37 on the forward ends of the sleeves 15 and 16.

Formed on the cover plate 12 above the cap plate 26 is a ball socket 38 in which is mounted the ball 39 of the control lever, said ball being provided with a double conic opening 40 therethrough, and extending through said opening is a pivot pin 41 freely fitting the opening at its smallest diameter. Thus, the ball may be rocked laterally in opposite directions upon the pin and may also be rocked forwardly and rearwardly. The cover plate is provided with recesses to accommodate the ends of the pin, and fitting over the ball is a cap plate 42 which, as seen in Figures 2 and 4, is provided with aligned housings 43 enclosing the ends of the pin. The cap plate is bolted or otherwise secured to the cover plate so that the pivot pin is thus confined between said plates while, at the same time, the ball may be freely rocked on said pin. Formed on the ball at its lower side is a short arm 44 which projects through the opening 27 of the cap plate 26 for coaction with the shifter bars 20 and 21, and upstanding from the ball at its upper side is an alined stud 45. Screwed over said stud is the stem 46 of the control lever. This stem is provided at its upper end with a spherical knob comprising a section 47 integral with the stem, and a somewhat smaller section 48 movable relative to the former section. Slidable through the stem is a latch rod 49 upon the upper end of which the section 48 of the knob is screwed, and formed on said rod at its lower end is a yoke 50 which is provided, as shown in Figure 3, with a tooth 51. Interposed between the sections 47 and 48 of the knob of the lever is a spring 52 which is accommodated in a suitable recess in the former section and acts against the latter section for pressing the latch rod upwardly.

Formed in the cap plate 42 at the front and rear of the ball 39 are transversely elongated openings 53, and freely accommodated at its ends by said openings to extend at a right angle to the pin 41 is a segment 54 which is freely received through the stem 46 of the control lever and through the yoke 50 of the latch rod 49. Confined between the cover plate 16 and the cap plate 42, as seen in Figure 1, are pivot pins 55 which lie in a plane with the pin 41 and swingingly mount the segment at its ends. Thus, when the control lever is rocked laterally, the segment will swing therewith and said segment is, as shown in Figure 3, provided at its lower edge with teeth for engagement by the tooth 51 of the yoke of the latch rod so that, as will be perceived, the rod will normally coact with the segment for locking the lever against forward and rearward movement. Freely received in suitable recesses in the housings 43 of the cap plate 42, as shown in Figure 2, are tensioning springs 56, one of which is shown in detail in Figure 7. The stems of these springs are riveted or otherwise secured to the said housings, and formed on said stems are segmental friction members 57 fitting the ball 39 at opposite sides thereof to yieldably bear against the ball. Thus, the springs will normally hold the control lever in vertical neutral position.

As will now be seen, by rocking the stem 46 of the control lever laterally in one direction, as shown in dotted lines in Figure 2, the arm 44 of the ball 39 of said lever may be moved into the recess 24 of the shifter bar 20, when, by pressing downwardly on the knob section 48 of the lever to disengage the latch rod 49 from the segment 54, the lever may be swung forwardly. Forward movement of the lever will, as will be appreciated, impart rearward movement to the shifter bar 20, with the result that the fork 33 will be rocked to draw the sleeve 15 forwardly and consequently shift the clutch member which is associated with said sleeve, to active position. After the control lever has been swung forwardly the proper distance to tightly bind the clutch member in active position, the latch rod 49 is released, when the spring 52 will immediately function to retract the rod so that the tooth 51 of the yoke 50 of the rod will be engaged with the segment 54 for locking the lever and consequently locking the clutch member active. By swinging the control lever rearwardly, the sleeve 15 may, as will be understood, be shifted rearwardly for moving the clutch member associated with said sleeve to a rearward active position, when, by releasing the latch rod 49, the clutch member may be locked in such position. Similarly, by rocking the control lever laterally in the opposite direction to dispose the arm 44 of the ball 39 in the recess 25 of the shifter bar 21, the control lever may then be swung forwardly for rocking the fork 34 and shifting the sleeve 16 forwardly to dispose the clutch member associated with said sleeve in forward active position. The latch rod 49 may then be released for locking the lever. On the contrary, by rocking the control lever rearwardly, the sleeve 16 may be shifted rearwardly to dispose the clutch member associated with said sleeve in rearward active position when, upon release of the latch rod 49, said clutch member will be locked in such position. Thus, as will be seen, the control lever may be manipulated for selecting different speeds.

Having thus described the invention, what I claim is:

1. In transmission mechanism, pivoted elements, a fixed guide block, shifter bars pivotally connected with said elements and movable on said block for swinging said elements, said bars being provided with recesses, a pivoted control lever having an arm, means mounting the lever for universal movement, the lever being adapted to be rocked laterally to engage the arm in the recess of either shifter bar and being movable forwardly or rearwardly for shifting either bar, a pivoted segment extending through the lever for movement laterally therewith, and a spring pressed latch rod carried by the lever to coact with said segment for locking the lever in set position when swung forwardly or rearwardly.

2. In transmission mechanism, a guide block, a cap plate mating therewith, shifter bars slidably confined between said plate and the block, detents housed by the block to coact with said bars for locking the bars in neutral position, a control lever, means mounting the lever for universal movement, the lever being adapted to be rocked laterally to engage either bar and being movable forwardly or rearwardly for shifting either bar, and means for locking the lever in set position when swung forwardly or rearwardly.

3. In transmission mechanism, a control lever, means mounting the lever for movement in different planes and including a ball supporting the lever for lateral movement as well as forward or rearward movement, a spring coacting with the ball for frictionally locking the lever when swung laterally, a pivoted segment extending through the lever and movable laterally therewith, and a latch carried by the lever to coact with said segment for locking the lever in set position when swung forwardly or rearwardly.

In testimony whereof I affix my signature.

ADOLPHUS SHADE BUTELL. [L. S.]